(12) United States Patent
Hansson et al.

(10) Patent No.: US 8,119,282 B2
(45) Date of Patent: Feb. 21, 2012

(54) POLE BRIDGE FOR A BATTERY

(75) Inventors: Nils Hansson, Elbingerode (DE); Detlef Rathmann, Niedersachsen (DE); Bjørn Haraldsen, Horten (NO)

(73) Assignee: Exide Technologies GmbH (DE)

( * ) Notice: Subject to any disclaimer, the term of this patent is extended or adjusted under 35 U.S.C. 154(b) by 1056 days.

(21) Appl. No.: 11/917,715

(22) PCT Filed: Jun. 8, 2006

(86) PCT No.: PCT/DE2006/000987
§ 371 (c)(1),
(2), (4) Date: Dec. 14, 2007

(87) PCT Pub. No.: WO2006/133674
PCT Pub. Date: Dec. 21, 2006

(65) Prior Publication Data
US 2009/0286146 A1 Nov. 19, 2009

(30) Foreign Application Priority Data
Jun. 16, 2005 (DE) .......................... 10 2005 028 066

(51) Int. Cl.
*H01M 2/10* (2006.01)
(52) U.S. Cl. ............ 429/208; 429/65; 429/66; 429/161; 429/247
(58) Field of Classification Search ................... 429/208
See application file for complete search history.

(56) References Cited

U.S. PATENT DOCUMENTS

| | | | |
|---|---|---|---|
| 2,599,477 A | * | 6/1952 | Patriquin ...................... 188/284 |
| 3,996,065 A | * | 12/1976 | Trippe et al. .................. 429/208 |
| 7,350,702 B2 | | 4/2008 | Bortolin et al. |
| 7,367,501 B2 | | 5/2008 | Bortolin et al. |
| 2008/0121697 A1 | | 5/2008 | Bortolin et al. |
| 2008/0121698 A1 | | 5/2008 | Bortolin et al. |

FOREIGN PATENT DOCUMENTS

DE 2356465 A1 5/1975
(Continued)

*Primary Examiner* — Ula C Ruddock
*Assistant Examiner* — Tony Chuo
(74) *Attorney, Agent, or Firm* — Joel T. Charlton

(57) ABSTRACT

The invention relates to a cell connector (6) for a battery, especially for absorbing, in conjunction with at least one damping element (9), the vertical forces that are caused by the impact of shocks. The cell connector (6), at one end, is connected to the positive or negative electrodes (4, 5) which are received in a housing (2) having a housing cover (3), and, at the other end, comprises at least one terminal (7, 8) projecting from the housing cover (3). The aim of the invention is to elastically dampen the electrode plates (4, 5) of an accumulator (1) which are disposed inside a housing (2). For this purpose, a terminal (6) having a supporting shoulder (11), integrally molded thereto, is used in the housing (2), a damping element (9), disposed between the housing cover (3) of an accumulator (1) and the cell connector (6), coming to rest thereon. The forces caused by the impact of shocks are passed from the cell connector (6) into the damping element (9) and from the at least one damping element (6) into the housing cover (3) via large-area plane faces (30, 31), said cover being fixed to the housing (2). This measure allows to elastically cushion the electrode plates (4, 5) inside the housing (2). For this purpose, the at least one damping element (9) has corresponding large dimensions and is adapted to receive higher vertical forces. The invention also allows the terminals (7, 8) to move in relation to the housing cover (3) if there is a movement of the electrode plates (4, 5) in relation to the housing (2).

20 Claims, 7 Drawing Sheets

FOREIGN PATENT DOCUMENTS

| | | |
|---|---|---|
| EP | 0083330 B1 | 7/1983 |
| WO | WO 98/52153 | 11/1998 |
| WO | WO 99/10824 | 3/1999 |
| WO | WO 99/16030 | 4/1999 |
| WO | WO 99/19846 | 4/1999 |
| WO | WO 99/44172 | 9/1999 |
| WO | WO 99/45507 | 9/1999 |
| WO | WO 99/49415 | 9/1999 |
| WO | WO 99/49426 | 9/1999 |
| WO | WO 00/39714 | 1/2000 |
| WO | WO 00/46665 | 8/2000 |
| WO | WO 00/54507 | 9/2000 |
| WO | WO 00/57315 | 9/2000 |
| WO | WO 00/57613 | 9/2000 |
| WO | WO 00/62265 | 10/2000 |
| WO | WO 00/62472 | 10/2000 |
| WO | WO 00/67185 | 11/2000 |
| WO | WO 00/68797 | 11/2000 |
| WO | WO 00/68902 | 11/2000 |
| WO | WO 00/68903 | 11/2000 |
| WO | WO 00/69183 | 11/2000 |
| WO | WO 00/75775 | 12/2000 |
| WO | WO 00/77750 | 12/2000 |
| WO | WO 01/04851 | 1/2001 |
| WO | WO 01/06341 | 1/2001 |
| WO | WO 01/08087 | 2/2001 |
| WO | WO 01/13572 | 2/2001 |
| WO | WO 01/15397 | 3/2001 |
| WO | WO 01/18633 | 3/2001 |

* cited by examiner

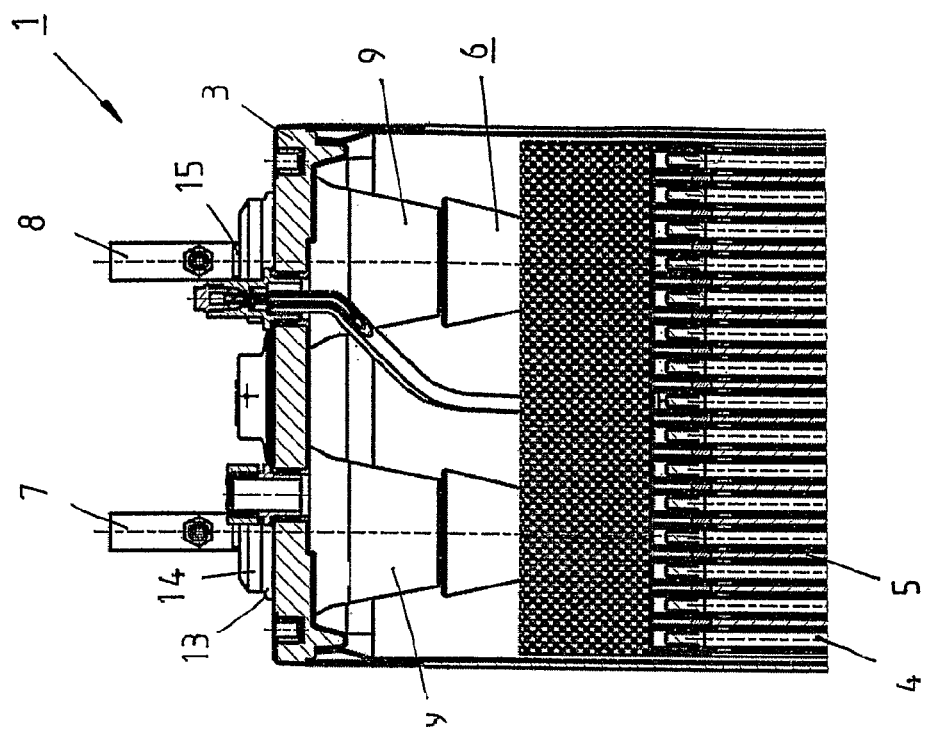
Fig. 1.1
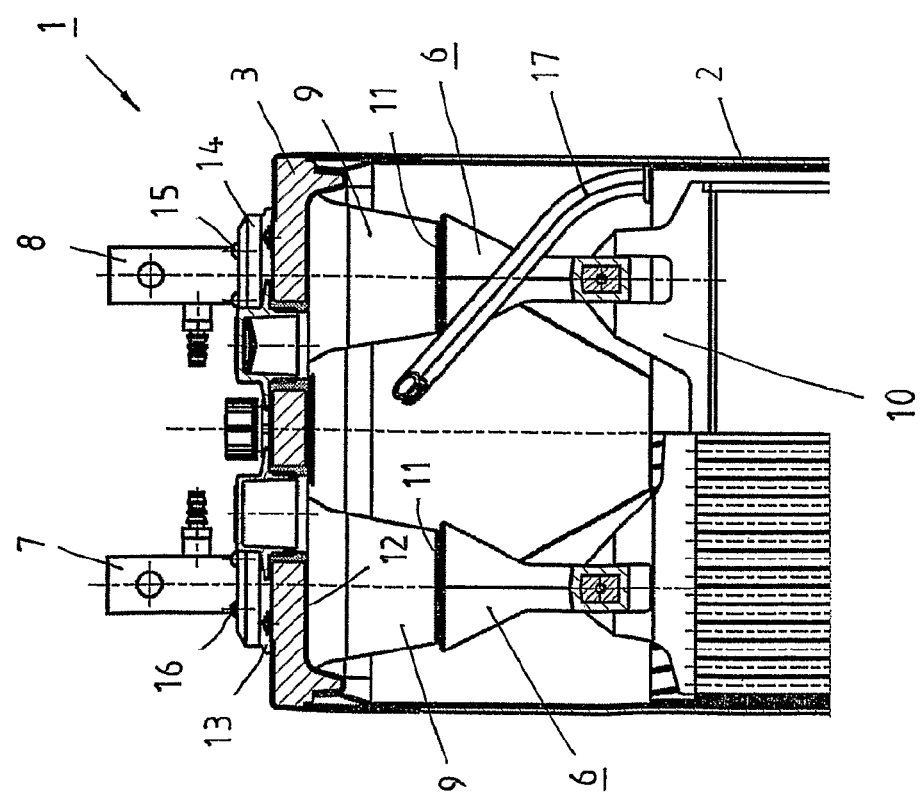
Fig. 1.2

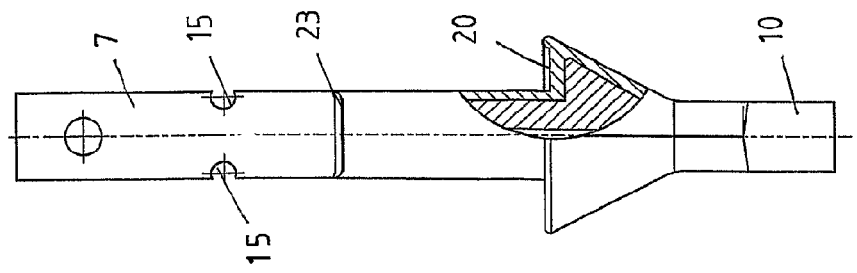
Fig. 2.2
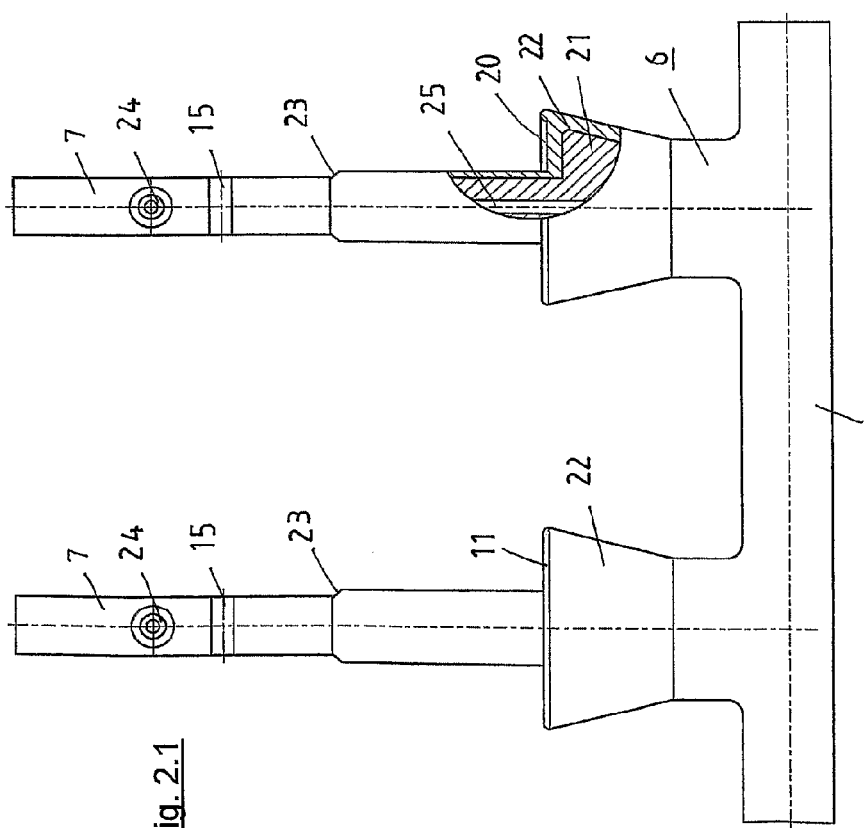
Fig. 2.1
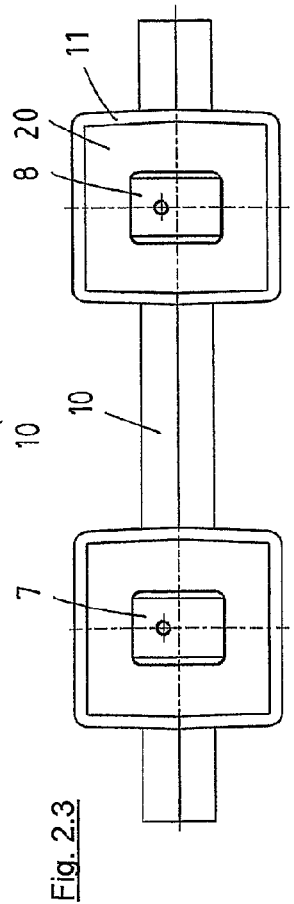
Fig. 2.3

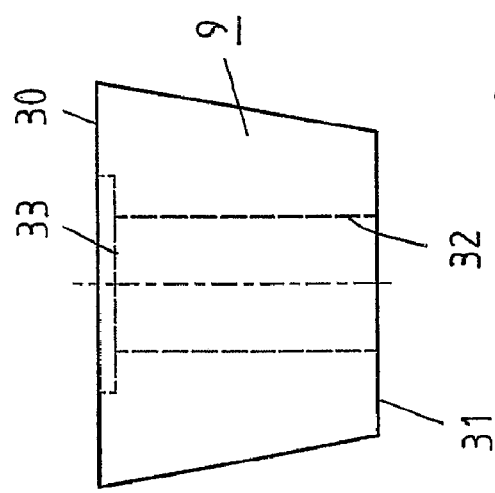
Fig. 3.1
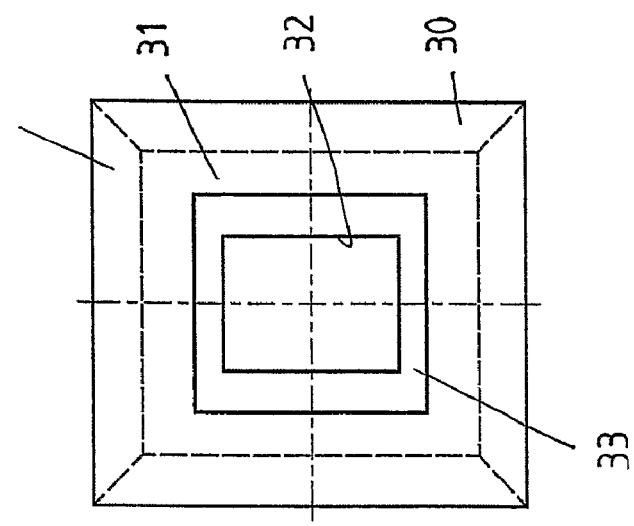
Fig. 3.2

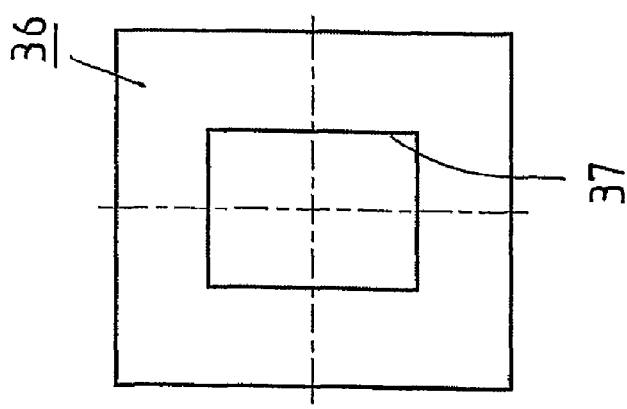
Fig. 4.1
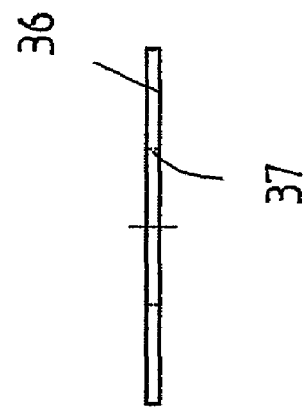
Fig. 4.2

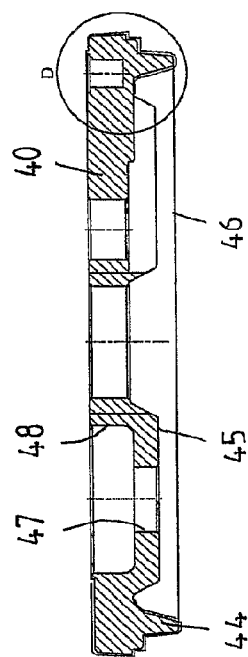
Fig. 5.1
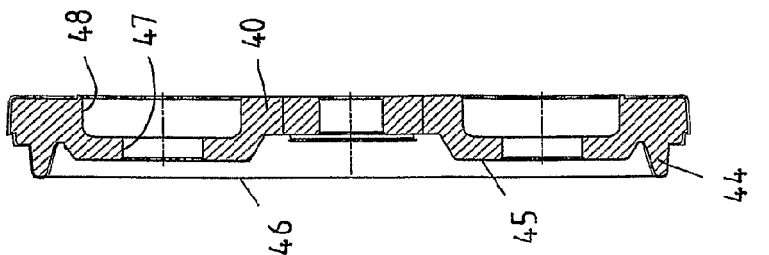
Fig. 5.3
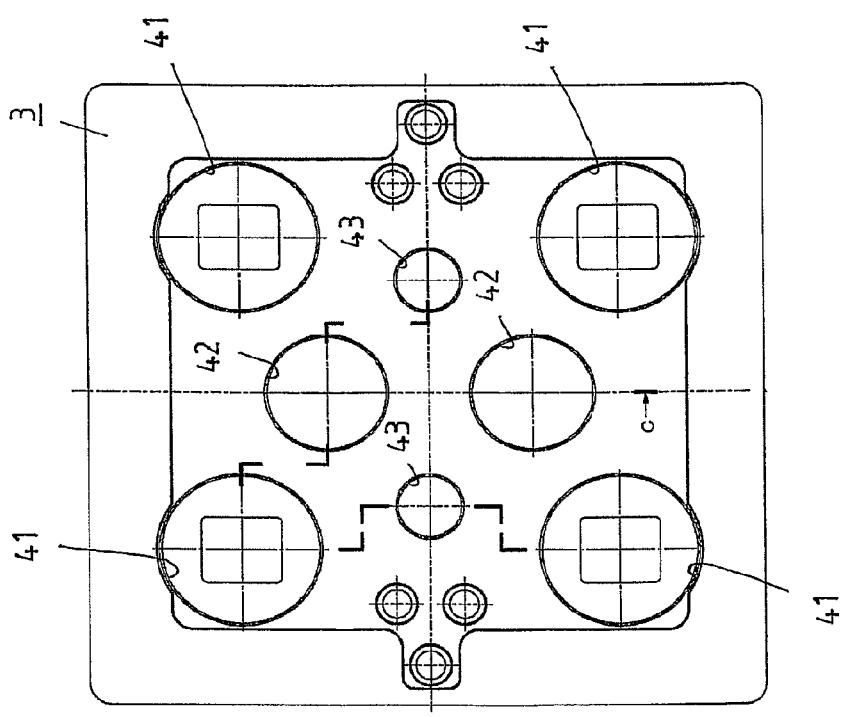
Fig. 5.2

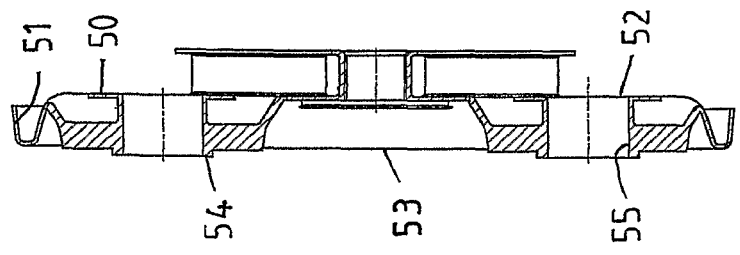
Fig. 6.3
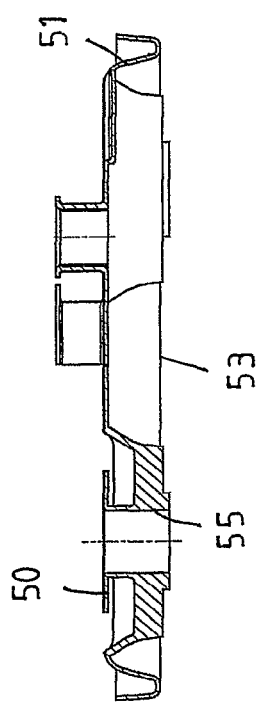
Fig. 6.1
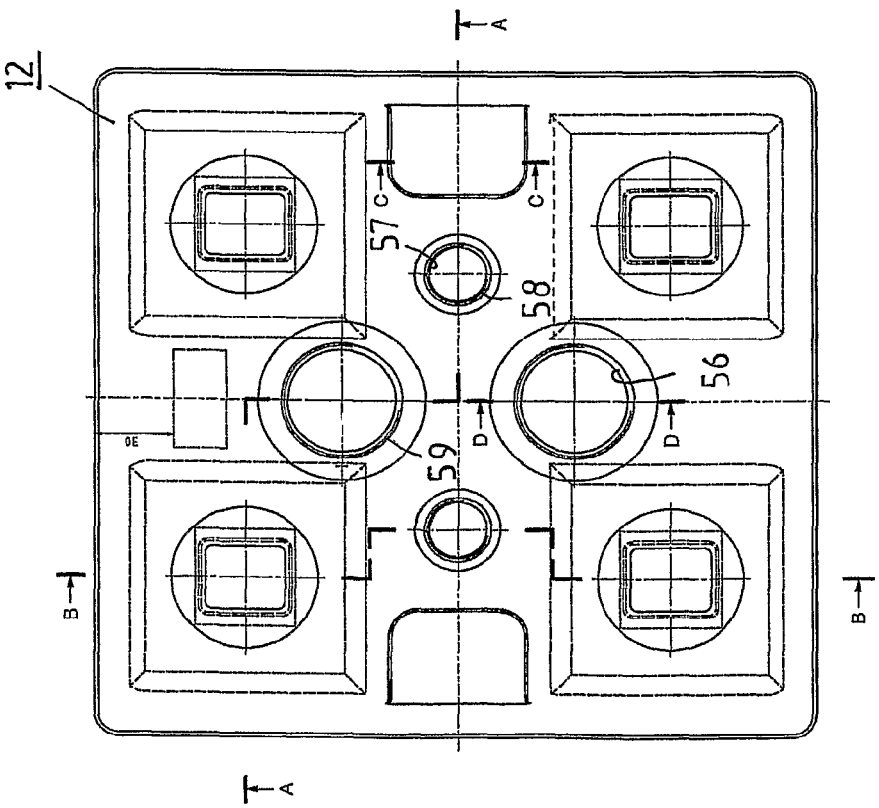
Fig. 6.2

Fig. 7.1
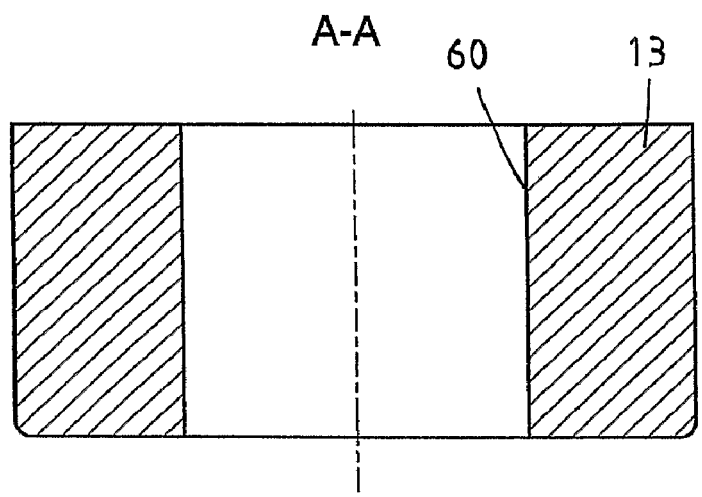
Fig. 7.2
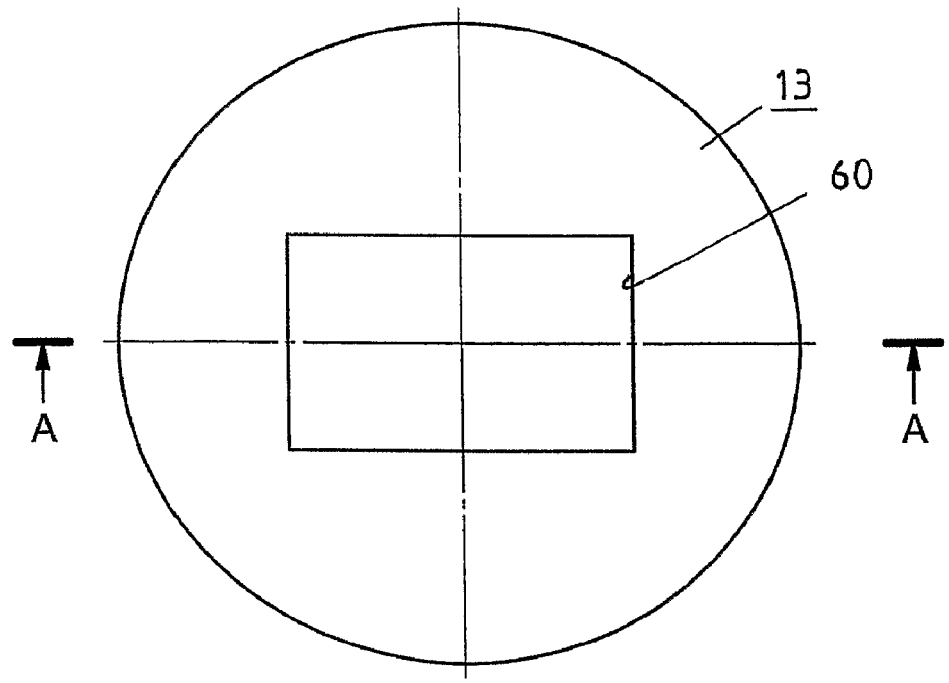

POLE BRIDGE FOR A BATTERY

FIELD OF THE INVENTION

The invention relates to a pole bridge for a battery in conjunction with at least one damping element, in particular for absorbing the vertical forces, which are caused by the impact of shocks, wherein the pole bridge is connected to the positive or negative electrodes at one end, which are received in a cell container with a cell lid, jointly forming the battery box and at the other end comprising at least one terminal, projecting from the cell lid.

BACKGROUND OF THE INVENTION

Pole bridges of this kind for batteries are required in order to connect all positive and negative electrodes amongst each other and to simultaneously provide the capability to perform an electrical connection outside of the battery box. For this purpose, a positive and also a negative pole bridge are being used, forming a positive and a negative terminal with their terminal.

Batteries are mostly used in land- and watercraft, wherein they are used for starting an engine, as an energy supply or energy source for an electric drive system. Depending on the application, these batteries are subject to considerable mechanical stress caused by the impacts of shocks. This can e.g. be the case when driving cross country, or due to external impacts. Such external impacts e.g. in military vehicles, in particular submarines, can also be the stresses caused by explosions, proximal to the vehicle or submarine. The shockwaves created can expose an automobile and also a submarine to short, but considerable impact acceleration. In submarines, this can also be caused e.g. by water bombs or similar, wherein not only loose equipment of a submarine, but also components mounted to the submarine, like e.g. batteries, are exposed to considerable shock impacts. This e.g. leads to the electrode plates and their pole bridges installed in battery boxes, performing a stroke of several centimeters, since the battery box is typically mounted to the submarine in a fixed manner. In an extreme case, this means that the electrode plates within the battery box are moved downwards, and also upwards, relative to the battery box, and thus also the pole bridges perform a vertical movement. For damping this vertical movement, it is known to provide thin elastic rubber disks between the pole bridges and the cell lid, in order to cushion the shock impact. Furthermore, solutions are known wherein hard and brittle materials are used, which fracture due to the applied pressure, thus allowing a compensation movement of the electrode plates. In this embodiment, it is disadvantageous that typically only a single shock effect can be absorbed, and in case of a reoccurrence, the electrode plates can perform a vertical movement within the battery box, which is not dampened, or where the damping effect is only very small. This typically leads to considerable damages to the cell container and the cell lid and typically of the electrode plates, so that the batteries are rendered useless.

DE 23 56 465 A1 teaches a damping system for electrode plates in a battery, which is achieved through an elastic support of the pole bridge in the cell lid. For this purpose, the shaft of the terminal is surrounded by an elastic element on both sides of the cell lid, wherein the two elastic elements on the outside and inside of the cell lid establish the force transfer between the cell lid and the pole bridge. This type of suspension, however, causes the cell lid to deform in the immediate proximity of the terminal shaft under a shock impact, or that the cylindrical damping elements deform under shock impact, so that multiple shock impacts cannot be safely absorbed.

Furthermore, it is provided in known solutions according to the state of the art for the damping elements to form a narrow collar around the terminal shafts, which is supported at the cell lid of the battery. In spite of the damping, the forces transferred by the damping element under shock impact are so high that the cell lid fractures in the portion of the damping elements.

BRIEF SUMMARY OF THE INVENTION

It is the objective of the invention to provide a solution, allowing improved damping of the electrode plates, and maintaining the damping properties also under multiple shock impacts without the cell lid of the battery fracturing under strong shock impact.

According to the invention it is provided in order to achieve the object, that the at least one terminal connection is provided with an integral support shoulder within the battery box, wherein the at least one damping element is provided, so that it contacts the support shoulder with a smaller planar surface, and contacts below the inner cell lid of the battery with a larger planar surface. Further advantageous embodiments of the invention can be derived from dependent claims.

In order to dampen a possible vertical force of the electrode plates within the battery box, a novel pole bridge is proposed comprising an integral support shoulder within the battery box. This support shoulder in conjunction with at least one damping element serves for elastically receiving vertical forces caused by shock effects without the electrode plates getting damaged. Through the support shoulder, thus a support surface is created, on which the at least one damping element is supported, and thus occurring vertical forces e.g. through an impact, can be inducted into the at least one damping element through a large surface. For this purpose, the at least one damping element can be slid onto the terminal in a loose manner, and is disposed within the battery box, wherein the at least one damping element contacts the support shoulder with one end and is supported below the cell lid, which is connected to the cell container, at the other end. The cell container and the cell lid are manufactured from fiberglass material in a known manner, and provided with a rubber coating on their inside, so that the battery acid present in the battery box cannot destroy the fiberglass cell container, or the fiberglass cell lid. In the transition area between the cell container and the cell lid, additionally a connection of the inner cell lid with the interior cell container wall is performed through gluing, vulcanization, and other comparable connection techniques.

Thus, the support shoulder of the terminal connection has a large surface and the at least one damping element has an approximately equal size planar surface, so that said damping element contacts the support shoulder with its entire surface, in order to transfer the occurring compression forces on a surface, which is as large as possible.

The shape of the at least one damping element and also of the support shoulder can thus be selected freely and can e.g. be round, oval, or polygon, in particular square.

The at least one damping element furthermore comprises a second planar surface, which contacts directly below the inner cell lid, wherein in a particularly advantageous embodiment the at least one damping element is provided conically tapered downward towards the pole bridge. By this measure it is accomplished that, on the one hand, a large scale transfer of the occurring pressure is performed into the cell lid and, on the other hand, it is prevented through the conical shape that the at least one damping element is deformed too much and experiences e.g. a bulging in the center portion. Through the transfer of the forces onto the cell lid of the battery box through a large surface, it is accomplished that the surface load on the material of the battery cell lid is maintained small under shock impact and as a consequence, the cell lid does not fracture.

In a further embodiment of the invention it is provided that the at least one damping element is comprised of an elastic natural rubber material, preferably Butyl natural rubber, which has the required mechanical stability and transfers the occurring compression forces into thermal energy. Hereby, an increased damper effect is accomplished, since a larger percentage of the occurring kinetic energy can be absorbed.

In another embodiment of the invention, it is provided that the upper support surface of the at least one damping element has a cutout, into which a protrusion of the cell lid, which is preferably comprised of a cell lid with an internally disposed interior rubber cover, protrudes. Hereby, assembly is facilitated and furthermore an improved guidance of the terminal connections is accomplished.

In order to compensate for the different expansion coefficients of the pole bridge, on the one hand, and of the at least one damping element, on the other hand, a seal element is advantageously disposed between them, wherein the support shoulder can have a cutout for the seal disk. In order to improve the sealing effect, the parallel seal surfaces of at least one damping element and of the seal element can at least partially be lubricated with silicon grease.

The at least one damping element used, thus can have a height of 40 to 80 mm, preferably 60 mm, and a first support surface of 3,000 to 4,000 mm$^2$, preferably 3,600 mm$^2$, and a second support surface of 5,000 to 7,000 mm$^2$, preferably 5,800 mm$^2$. By means of the support surfaces, it is assured, that an optimum transfer of the occurring pressure forces into the at least one damping element occurs, wherein through the height of the at least one damping element an elastic vertical movement of the electrode plates is possible, also over a larger travel distance. The electrode plates themselves are supported relative to the floor of the battery cell container by means of additional damper strips, comprising a thickness of 40 to 50 mm, so that the electrode plates are cushioned downwards, and also upwards, in a damping manner.

In another particular embodiment, it is provided, that the cell lid comprises a cutout for a seal ring on the outside, which rests in the cutout in disk shape, and through which the terminal connection protrudes to the outside, wherein a metal disk rests on the damper ring, and wherein it is clamped by means of bolts, which are supported in grooves provided in the pole connection. While the at least one damping element is used for cushioning a vertical element of the electrode stack upward against the cell lid, the seal ring is provided for supporting the electrode stack downward and can thus be designated as an outer damping element, wherein said damping element engages with the damper strip in the floor portion in order to cushion the electrode stack in an elastic manner. The seal ring thus comprises a height of approximately 25 to 40 mm, preferably 30 mm, with a diameter of 50 to 70 mm, preferably 60 mm. In an advantageous manner, the seal ring is inserted in a cutout of the cell lid, in order not to increase the height of the battery, or in order not to reduce the interior volume of the battery.

Typically, the terminal is comprised of copper, in order to assure a high current inflow and outflow with minimum loss. The integral support shoulder formed at the terminal in the pole bridge according to the invention, is also comprised of copper, wherein a high form stability is accomplished, and thus the forces can be transferred into the at least one damping element in an optimum manner. For protection against the present acid, the support shoulder is encased with lead, wherein the terminal is at least partially encased in lead, preferably up to the elevation of the housing cover, so that even splashes of acid due to rocking motions cannot damage the terminal or the pole bridge. Thus, it is avoided, that acid creeping up at the pole bridge and at the terminal can cause damage. As an additional seal means, the silicon grease and the seal disk are provided, which is provided below the at least one damping element, wherein in the upper area, the at least one damping element directly contacts the cell lid, which is e.g. comprised of rubber or natural rubber, and additionally provides the possibility that the at least one damping element can be connected with the cell lid in a sealing manner, e.g. by means of vulcanizing. The cell lid and the cell container itself are connected amongst each other, so that a separation of both components can only be performed under great force, which typically means that the battery box is destroyed.

The main novel idea of the invention is to cushion shock impacts by means of a reinforced pole bridge with an integrally formed support shoulder and at least one large surface damping element, and thus to dampen a vertical movement of the electrode plates, wherein preferably elastic materials are used, which can absorb multiple shock impacts without permanent deformation. Thus, it is provided that through the at least one large surface damping element, the forces, which are transferred through the damping element onto the housing cover, are distributed, far enough, so that the housing cover does not fracture under shock impact.

BRIEF DESCRIPTION OF THE DRAWINGS

The invention is subsequently described in more detail with reference to figures, showing in:

FIG. 1 an upper battery portion in two sectional side views;
FIG. 2 a pole bridge according to the invention in three views;
FIG. 3 a damping element according to the invention in two views;
FIG. 4 a seal element in two views;
FIG. 5 the cell lid in three views;
FIG. 6 the interior cell lid in three views; and
FIG. 7 a seal element according to the invention in two views.

DETAILED DESCRIPTION OF THE INVENTION

FIGS. 1.1 and 1.2 illustrate two sectional views of the upper portion of a battery 1, comprised of a cell container wall 2, a cell lid 3, and internal positive and negative electrode plates 4, 5 and a pole bridge 6, connecting the electrode plates 4, 5 amongst each other, and thus respectively the positive and negative electrode plates 4, 5. By means of a terminal 7, 8, which protrudes from the upper cell lid 3, and which is provided for connecting the battery 1, the battery can be connected. The pole bridge 6 can be seen in detail from the FIGS. 2.1, 2.2, and 2.3, and a damping element 9 according to the invention can be seen in FIGS. 3.1 and 3.2. A seal element located between the damping element 9 and the pole bridge 6 can be seen from the FIGS. 4.1 and 4.2, the cell lid is evident from the FIGS. 5.1, 5.2, and 5.3 and the interior cell lid is evident from the FIGS. 6.1, 6.2, and 6.3, and a seal ring is evident above the housing cover from the FIGS. 7.1 and 7.2.

The cell container 2 of the battery 1 is typically comprised of fiberglass material and provided with a rubber lining on the inside, and thus the cell container 2 and the cell lid 3 are protected from damages due to acid impact after filling with acid. In the illustrated embodiment, the cell lid 3 is comprised of an outer cell lid 3 from fiberglass material and an interior cell lid 12, which is typically made from rubber, or a material similar to rubber, and glued together, or vulcanized with the inner wall of the cell container 2 after assembly. Above the electrode plates 4, 5, the pole bridge 6 is disposed, comprising a bridge like connection element 10 on the side facing the electrode plates 4, 5 in order to facilitate contacting the positive or negative electrode plates 4, 5. Above the electrode plates 4, 5, the pole bridge 6 is widened in a trapezoid shape so that a support shoulder 11 is created. The damping element 9 according to the invention rests on the support shoulder 11, which at the one end rests on the support shoulder 11, and on the other end, contacts below the inner cell lid 12. The pole bridge 6 itself protrudes through the cell lid 3 and the inner cell lid 12 upward out of the cell container 2 with the respective terminal 7, 8. In order to support the pole bridge 6 in a damping manner relative to the cell lid 3, the mounting of the damping element 9 according to the invention is performed below the cell lid 3 and the inner cell lid 12. Furthermore, a seal ring 13 is slid onto the terminal 7, 8 from the outside, which is directly placed in an indentation of the cell lid 3, and covered by a steel washer 14. In order to clamp the lower damping element 9 with the seal ring 13, wherein between the seal ring 13 and the damping element 9 the inner cell lid 12 and the outer cell lid 3 is located, the seal ring 13 and the damping element 9 are compressed during assembly, so that two lateral notches of the terminal 7, 8 are exposed, in order to insert a safety pin 16 on two sides of the terminal connection 7, 8. The safety pin 16 rests in a depression of the steel washer 14 and is pressed into the depression of the steel washer 14 after loosening the assembly pressure, so that the inner cell lid 12 and the cell lid 3 are compressed between the damping element 9 and the seal ring 13. In the cell lid further cutouts are provided, which e.g. are used for checking or displaying the acid level, and to supply air, to agitate the electrolyte. Feeding air is performed e.g. by a hose 17, which is illustrated in the left and right half of the figure.

The FIGS. 2.1, 2.2, and 2.3 show the pole bridge 6 according to the invention in three views with a lower bridge shaped connection element 10, which is simultaneously provided for connecting the positive or negative electrode plates. Above the connection element 10, the pole bridge 6 widens in upward direction in trapeze shape in the illustrated embodiment and leads to a square support shoulder 11. Instead of a square, also an oval, round, or polygonal support shoulder 11 can be provided. An indentation 20 is provided in the support surface of the support shoulder 11, so that a washer is positioned between the support shoulder 11 of the pole bridge 6 and the damping element 9, which can be slid on here, but which is not shown. Above the support shoulder 11, the pole bridge 6 transitions into a rectangular or possibly square terminal 7, 8. As can be seen from the partial sectional view, the pole bridge 6 is comprised of an inner core 21 and an outer jacket 22. The core 21 is comprised of copper, while the jacket 22 is provided as a lead jacket, so that the copper is protected from the electrolyte. For this purpose, the bridge shaped connection element 10, the pole bridge 6 with the support shoulder 11, and the terminals 7, 8 are clad with lead up to the height of the cell lid 3. The cell lid, which is not shown, can be slid up to the elevation of the provided shoulder 23 onto the terminals 7, 8 during assembly. Above the cell lid, the pole bridge 6 with its terminals 7, 8 protrudes from the cell lid 3 without lead cladding. In order to load the damping element and the upper seal washer, safety pins are provided as already illustrated in the FIGS. 1.1 and 1.2, which are disposed respectively in a notch 15 of the terminal 7, 8. The lateral bore hole 24 in the terminals 7, 8 is used for cooling the pole bridge 6 with water through a flow channel 25, wherein said water is inducted through a bore hole 24 and fed through the flow channel 25 to the second bore hole 24, so that a water circulation is facilitated.

FIGS. 3.1 and 3.2 show the damping element 9 according to the invention in two views, wherein said damping element in the illustrated embodiment comprises two square planar surfaces 30, 31, and an opening 32, which leads into a cutout 33. The damping element 9 with the smaller planar surface 31 contacts the support shoulder of the pole bridge 6 after assembly, wherein a seal element is inserted into the cutout 20. The other planar surface 31 directly contacts the inner cell lid 12, wherein a protruding portion of the inner cell lid 12 protrudes into the recess 33, so that the damping element precisely abuts to the elastic rubber inner cell lid 12. All contact surfaces of the damping element 9 and of the inner cell lid 12 can additionally be coated with silicon grease in order to improve the sealing properties. In the opening 32 the upper part of the pole bridge and thus the terminal 7 or 8 have to be received, this means the damping element 9 is slid onto the terminal 7, 8 until the planar surface 31 contacts the support shoulder 11.

FIGS. 4.1 and 4.2 show a seal disk 35 in two views, wherein said seal disk is provided square in the illustrated embodiment, and is disposed in the recess 20 of the pole bridge 6. Therefore, the seal disk 36 has a recess 37, so that the seal disk 36 can be slid over the terminal 7, 8 and contacts the support shoulder 11. According to the shape of the support shoulder 11 of the pole bridge 6, the seal disk 36 can deviate from the illustrated embodiment, this means a rectangular, oval, circular, or polygon shape can also be used.

FIGS. 5.1, 5.2, and 5.3 show the cell lid 3 in three views, wherein two views are shown as sectionals. The cell lid 3 is provided rectangular in the illustrated embodiment and is comprised of a base body 40, which has four symmetrical openings 41 for receiving the pole connections, and additional bore holes and openings 42, 43, which are partially provided for venting the interior and for receiving closure plugs or control indicators for the acid level. On the bottom of the cell lid 3, there is a circumferential rim 44, which is disposed flush in a recess of the inner cell lid 12. Furthermore, the cell lid 3 is provided with a step shaped contour 45 on the bottom side, comprising four planar surfaces 46, on which similar shaped planar surfaces of the inner cell lid 12 contact, in order to transfer the occurring forces into them, which impact the cell lid through the damping element, over a large area. Through an opening 47, these terminals 7, 8 reach upward out of the cell lid 3, wherein the openings 47 on the outside transition into a larger recess, into which a seal ring is inserted.

FIGS. 6.1, 6.2, and 6.3 show the inner cell lid 12, which is comprised of a rubber elastic material. The upper contour 50 of the inner cell lid 12 is mostly adapted to the contour 45 of the cell lid 3. In a cavity 51, e.g. the rim 44 of the cell lid 3 is received, while integrally shaped tubular walls 52 protrude into the opening 47 of the cell lid 3, and are pressed in, so that not only the bottom side of the cell lid 3, but also the present openings are covered with rubber elastic material. On the bottom side 53 of the inner cell lid 12, four integrally shaped protrusions 54 are provided, which protrude into the corresponding recesses 33 of the damping element 9, thus facilitating a secure mounting of the damping element 9 relative to the inner cell lid 12, thus avoiding a subsequent sliding of the damping element 9. Thus, it furthermore has to be taken into account that the terminals 7, 8 protrude through the center opening 55 outward and thus assure a precisely fitted assembly of pole bridge 6 with damping element 9, inner cell lid 12 and cell lid 3. Other available openings 56 or 57 with partially collar shaped protrusions 58, 59 also protrude into the existing openings 42, 43 of the housing cover 3 and assure a complete encasement of the cell lid 3 from the inside.

FIGS. 7.1 and 7.2 show a seal ring 13, which is disposed in the recess 48 of the cell lid 3. The seal ring 13 comprises a rectangular opening 60, through which the terminal 7, 8 of the pole bridge 6 protrudes from the cell container 2. In the illustrated embodiment, the seal ring 13 is provided circular. There certainly is the possibility of changing the recess 48 in the cell lid 3, and to select another shape of the seal element.

In the present invention, a damping of the electrode plates 4, 5 is achieved by means of the novel pole bridge 6 by the pole bridge 6 transmitting the forces into an existing elastic damping element 9 by means of a large sized support shoulder 11. The damping element 9 on the one hand directly rests on the support shoulder 11 of the pole bridge 6, or on a seal element, while the other end contacts below the inner cell lid 12. Through the damping element 9, the inner cell lid 12 and the outer cell lid 3 of the respective terminal 7, 8 protrudes from the cell container 2, allowing the connection of the battery for supplying a piece of equipment or a drive motor with electric energy. In an advantageous manner several batteries 1 are connected into larger units, in order to either achieve a voltage increase or higher electrical power. In order to achieve a sufficient damping effect of the assembly according to the invention, furthermore the cell lid 3 or the inner cell lid 12 is wedged between the inner damping element 9 and an outer seal ring 13. The wedging is accomplished through the two elastic elements being compressed during assembly and by a steel washer contacting the outer seal ring being secured by means of two safety pins 16 at the respective terminal connections 7, 8. The safety pins 16 thus rest in a provided cavity of the steel washer and in a notch 15 of the terminal 7, 8.

In case of an occurring shock impact upon the battery, preferably by vertical forces, thus the movement of the electrode plates 4, 5 within the cell container 2, due to the available damping element 9, is slowed down far enough, so that only a small movement occurs relative to the cell container. For this purpose, it is necessary that the occurring forces are initially transferred through a large size support shoulder 11 of the pole bridge 6 into the damping element 9, and this damping element, on the other hand, is supported through an also large sized support surface relative to the cell lid 3, or the inner cell lid 12. By means of the large surface force transfer into the cell lid it is avoided that the cell lid fractures under shock impact. By means of selecting a respective plastic material, a deformation of the damping element 9 is only permitted within certain limits, and in particular, the occurring kinetic energy is transferred into heat. The particular advantage of this assembly is that the pole bridge 6 with the damping element 9 can not only cushion one jolt, but several jolts caused by shock impact. For this purpose, furthermore, a damper strip is used, which is disposed below the electrodes 4, 5, which cushions the electrodes relative to the bottom of the cell container in a known manner.

DESIGNATIONS 1 battery
2 cell container
3 cell lid
4 electrode plate
5 electrode plate
6 pole bridge
7 terminal
8 terminal
9 damping element
10 connection element
11 support shoulder
12 inner cell lid
13 seal ring
14 steel washer
15 notch
16 safety pin
17 hose
20 cutout
21 core
22 jacket
23 shoulder
24 bore hole
25 flow channel/cooling channel
30 planar face
31 planar face
32 opening
33 recess
35 seal disk
36 seal disk
37 recess
40 core body
41 opening
42 opening
43 opening
44 rim
45 contour
46 planar surface
47 opening
48 recess
50 contour
51 cavity
52 wall
53 bottom side
54 protrusion
55 opening
56 opening
57 opening
58 bulge
59 bulge
60 opening

What is claimed is:

1. A pole bridge for a battery comprising
at least one damping element for absorbing vertical forces through deformation of the at least one damping element caused by impacts of shocks,
wherein the pole bridge, at one end, is connected to positive or negative electrodes, which are received in a cell container having a cell lid, and at the other end, including at least one terminal, projecting from the cell lid,
wherein the at least one terminal has a supporting shoulder, integrally molded thereto, within the cell container, and
wherein the at least one damping element is formed so that it is supported at the supporting shoulder with a smaller planar face and with a larger planar face below an inner lid of the battery.

2. A pole bridge according to claim 1, wherein the at least one damping element is provided, so it is slideable onto the terminal.

3. A pole bridge according to claim 2, wherein the support shoulder is sized with a planar large surface and the at least one damping element is supported with an approximately equal size planar face at the support shoulder.

4. A pole bridge according to claim 1, wherein the at least one damping element is round, oval, square or polygonal and includes at least one such support surface.

5. A pole bridge according to claim 4, wherein the at least one damping element is provided conically tapered downward, in a direction towards the pole bridge.

6. A pole bridge according to claim 4 wherein the at least one damping element includes an elastic natural rubber material, which includes the required form stability and converts occurring pressure forces into thermal energy.

7. A pole bridge according to claim 4, wherein the upper support surface of the at least one damping element includes recess, into which a protrusion of the cell lid protrudes, the cell lid has an inner cell lid that includes rubber.

8. A pole bridge according to claim 4, wherein between the support shoulder and the at least one damping element, a seal element is disposed.

9. A pole bridge according to claim 4, at wherein the support shoulder includes a recess for a seal element between support shoulder and the at least one damping element within a lead jacket.

10. A pole bridge according to claim 4, wherein the parallel planar faces of the at least one damping element are at least partially lubricated with silicon grease.

11. A pole bridge according to claim 4, wherein the at least one damping element has a height of 40 to 80 mm.

12. A pole bridge according to claim 4, wherein the at least one damping element includes a first support surface with an area of 3,000 to 4,000 $mm^2$, and a second support surface with an area of 5,000 to 7,000 $mm^2$.

13. A pole bridge according to claim 4, wherein the cell lid comprises a recess on its outside for a seal ring, which is disposed in disk shape in the recess, and through which the terminal protrudes to the outside, wherein a metal disk rests on the seal ring, and is clamped by means of the safety pins, which are disposed in the provided recesses of the terminal.

14. A pole bridge element according to claim 4, wherein a seal ring is provided as a second seal element, which has height of 25 to 40 mm.

15. A pole bridge according to claim 14, wherein a second damping element is slid onto the terminal from above.

16. A pole bridge according to claim 14, wherein the seal ring includes a diameter of 50 to 70 mm.

17. A pole bridge according to claim 4, wherein the terminal includes copper.

18. A pole bridge at least one damping element according to claim 4, wherein the pole bridge and, in particular, a portion of the support shoulder is clad with lead.

19. A pole bridge according to claim 4, wherein the terminal is at least partially clad with lead.

20. A pole bridge according to claim 4, wherein the terminal is clad with lead up to the elevation of the lid.

* * * * *